US008117452B2

(12) United States Patent
Bell et al.

(10) Patent No.: US 8,117,452 B2
(45) Date of Patent: Feb. 14, 2012

(54) SYSTEM AND METHOD FOR ESTABLISHING A SECURE ASSOCIATION BETWEEN A DEDICATED APPLIANCE AND A COMPUTING PLATFORM

(75) Inventors: Robert T. Bell, Bountiful, UT (US); Graham G. Gudgin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 10/983,008

(22) Filed: Nov. 3, 2004

(65) Prior Publication Data

US 2006/0095772 A1    May 4, 2006

(51) Int. Cl.
*H04L 9/00* (2006.01)
(52) U.S. Cl. .................. 713/171; 713/168; 713/169
(58) Field of Classification Search .................. 713/168, 713/169, 170, 171, 173, 175; 726/5, 18, 726/19; 709/223, 224, 225; 455/410, 411
See application file for complete search history.

(56) References Cited

U.S. PATENT DOCUMENTS

| | | | | |
|---|---|---|---|---|
| 5,887,065 | A | 3/1999 | Audebert | 380/23 |
| 5,917,909 | A | 6/1999 | Lamla | 380/4 |
| 5,917,913 | A | 6/1999 | Wang | 380/25 |
| 6,170,057 | B1 | 1/2001 | Inoue et al. | 713/153 |
| 6,185,678 | B1 | 2/2001 | Arbaugh et al. | 713/2 |
| 6,334,190 | B1 | 12/2001 | Silverbrook et al. | 713/500 |
| 6,351,813 | B1 | 2/2002 | Mooney et al. | 713/185 |
| 6,374,354 | B1 | 4/2002 | Walmsley et al. | 713/167 |
| 6,442,525 | B1 | 8/2002 | Silverbrook et al. | 705/1 |
| 6,745,331 | B1 | 6/2004 | Silverbrook | 713/200 |
| 6,795,917 | B1 | 9/2004 | Ylonen | 713/160 |
| 7,251,729 | B1 * | 7/2007 | Park | 713/168 |
| 2002/0166048 | A1 * | 11/2002 | Coulier | 713/169 |
| 2002/0174372 | A1 * | 11/2002 | Venkataraman | 713/400 |
| 2003/0041244 | A1 * | 2/2003 | Buttyan et al. | 713/172 |
| 2003/0204726 | A1 * | 10/2003 | Kefford et al. | 713/171 |
| 2004/0034776 | A1 * | 2/2004 | Fernando et al. | 713/171 |
| 2004/0093419 | A1 * | 5/2004 | Weihl et al. | 709/229 |
| 2004/0158635 | A1 * | 8/2004 | Walls-Manning et al. | 709/226 |
| 2005/0108571 | A1 * | 5/2005 | Lu et al. | 713/201 |
| 2005/0193203 | A1 * | 9/2005 | Freeman et al. | 713/171 |
| 2005/0210252 | A1 * | 9/2005 | Freeman et al. | 713/171 |
| 2005/0228997 | A1 * | 10/2005 | Bicker | 713/171 |
| 2006/0095957 | A1 * | 5/2006 | Lundblade et al. | 726/5 |

* cited by examiner

*Primary Examiner* — Minh Dinh
*Assistant Examiner* — Izunna Okeke
(74) *Attorney, Agent, or Firm* — Baker Botts L.L.P.

(57) ABSTRACT

An apparatus is provided that includes a dedicated appliance operable to interface with a computing platform. A provisioning process may be initiated such that the dedicated appliance responds by monitoring a port for a connection request from the computing platform. Upon receiving the connection request the dedicated appliance completing a connection and generates a random numeric or an alphanumeric string, the dedicated appliance calculating a key derived from the random numeric string or the alphanumeric string using a key derivation process. The dedicated appliance waits for the credential packet from the computing platform before establishing a secure connection between the dedicated appliance and the computing platform.

30 Claims, 3 Drawing Sheets

FIG. 1

SYSTEM AND METHOD FOR ESTABLISHING A SECURE ASSOCIATION BETWEEN A DEDICATED APPLIANCE AND A COMPUTING PLATFORM

TECHNICAL FIELD OF THE INVENTION

This invention relates in general to the field of communications and, more particularly, to a system and method for establishing a secure association between a dedicated appliance and a computing platform.

BACKGROUND OF THE INVENTION

Communications architectures have grown increasingly important in today's society. One aspect associated with communication architecture relates to interface elements that serve to facilitate the exchange of data or information. As the subscriber base of end users increases, their diverse needs create new challenges for network designers and system administrators. Interfacing elements should generally provide speed and efficacy in offering a convenient and an easy-to-use device for the end user.

A personal computing device may offer a number of capabilities that are not provided by another device (e.g. a telephone in this example). An association between a telephone and a personal computing device could allow any number of capabilities to be realized by the telephone. For example, the telephone could share the resources of the associated personal computing device and, thus benefit from the capabilities thereof. Thus, the ability to provide a suitable connection between two devices (such that the benefits of one are realized by the other) creates a significant challenge for system designers and component manufacturers.

SUMMARY OF THE INVENTION

From the foregoing, it may be appreciated by those skilled in the art that a need has arisen for an improved communications approach that provides for enhanced interaction between a dedicated appliance and a computing platform. In accordance with one embodiment of the present invention, a system and method for establishing a secure, trusted connection between a dedicated appliance and a computing platform are provided that greatly reduce disadvantages and problems associated with conventional communication techniques.

According to one embodiment of the present invention, there is provided an apparatus that includes a dedicated appliance operable to interface with a computing platform. A provisioning process may be initiated such that the dedicated appliance responds by monitoring a port for a connection request from the computing platform. Upon receiving the connection request the dedicated appliance completing a connection and generates a random numeric or an alphanumeric string, and presents it to the user, the dedicated appliance calculating a key derived from the random numeric string or the alphanumeric string using a key derivation process. The dedicated appliance waits for the credential packet from the computing platform before establishing a secure connection between the dedicated appliance and the computing platform.

In another embodiment of the present invention (from the perspective of a computing platform), there is provided an apparatus that includes a computing platform operable to establish a secure connection with a dedicated appliance. Either the computing platform or the dedicated appliance may initiate a provisioning process on the computing platform. If no designated certificate is available, a self-assigned certificate or any other suitable credential is created. The computing platform solicits a selection of an Internet Protocol (IP) address of the dedicated appliance, the computing platform opening a connection to the dedicated appliance. The computing platform prompts entry of a random numeric or an alphanumeric string provided by the dedicated appliance, the computing platform being operable to derive a key from the random numeric or alphanumeric string. The computing platform creates a credential packet that includes a certificate of the computing platform or any other suitable credential. The computing platform then transmits the credential packet in order to establish the secure connection between the computing platform and the dedicated appliance.

Certain embodiments of the present invention may provide a number of technical advantages. For example, according to one embodiment of the present invention, a communications approach is provided that accommodates a variety of potential end users seeking to leverage the capabilities of the computing platform with their dedicated appliance. A flexible architecture is provided that allows for an optimal information exchange (with minimal effort from the end user) in order to establish a secure connection between the two elements. With the connection having been secured, the end user is then afforded the opportunity to realize the capabilities or to utilize the resources of the computing platform.

Yet another technical advantage associated with one embodiment of the present invention is its versatility. The features provided by the present invention may be expanded to implementations that involve any number of dedicated appliances and computing platforms that, in accordance with the teachings of the present invention, effectively cooperate in order to achieve optimal performance for the end user. Thus, one device (i.e. the dedicated appliance) can employ the potential, the resources, and the capacities of another device (i.e. the computing platform).

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1:
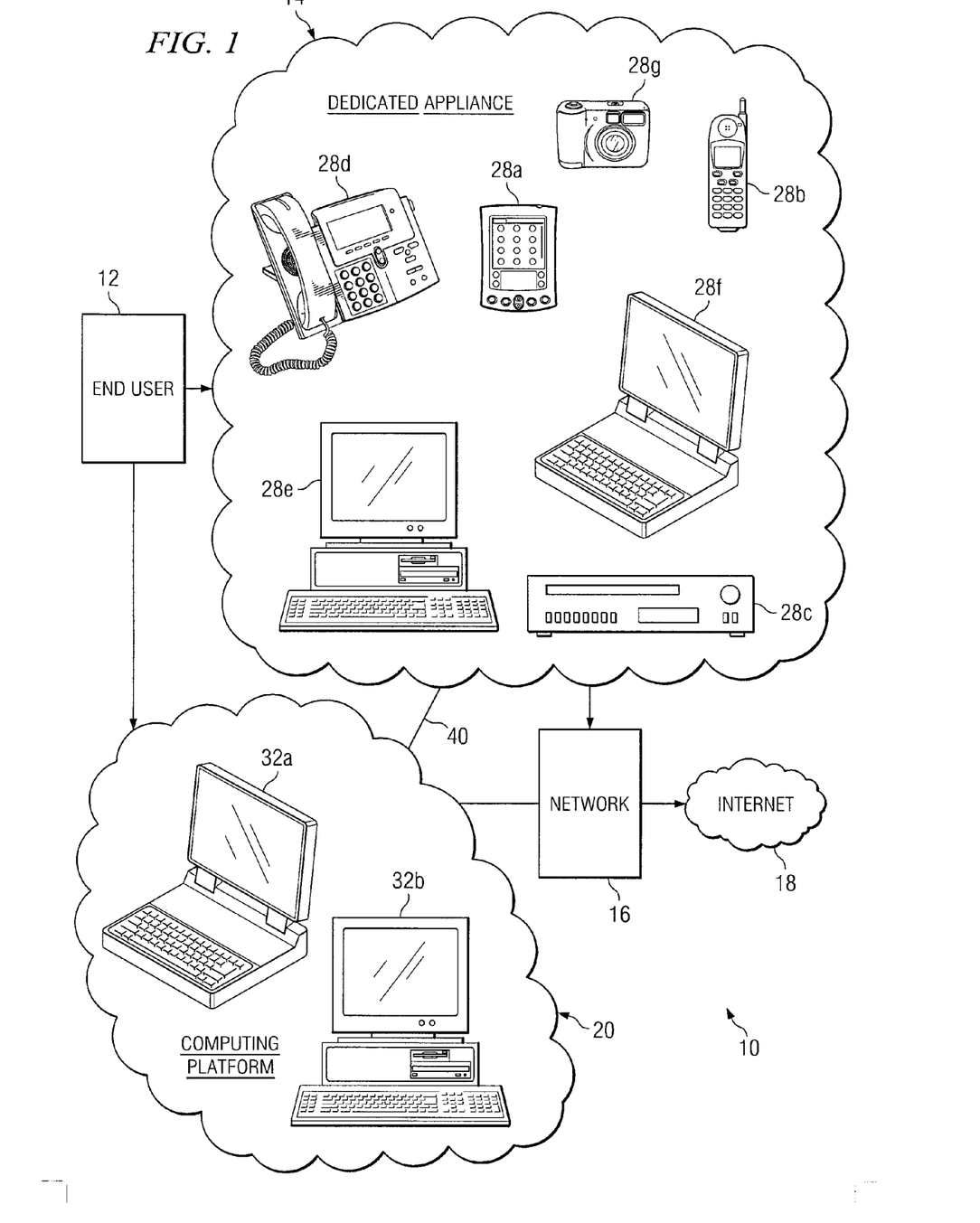
FIG. 1 is a simplified block diagram of a communication system for establishing a connection between two components in accordance with one embodiment of the present invention.

FIG. 1 is a simplified block diagram of a communication system 10 for establishing a secure, trusted connection between two elements that may be used by an end user 12. Communication system 10 may include a dedicated appliance 14 and a computing platform 20: both of which may be operated by end user 12. Communication system 10 may also include a network 16, an Internet 18, and a connection 40 between computing platform 20 and dedicated appliance 14. Each dedicated appliance 14 may include a plurality of buttons, a visual interface, and/or a series of keys where appropriate. Keys, buttons, and displays may correlate to specific capabilities or functions being provided by dedicated appliance 14. Additionally, communication system 10 may include a number of additional intermediate or ancillary components that facilitate any of the operations of dedicated appliance 14, network 16, and/or Internet 18.

FIG. 1 may be generally configured or arranged to represent a communications architecture in which dedicated appliance 14 may establish a connection to Internet 18 via network 16. However, the architecture of communication system 10 as illustrated in FIG. 1 may be varied significantly, or alternatively substituted with any suitable networking components or elements that operate to provide a communicative platform for end user 12.

Note that there are many reasons why a person would want to create a secure and trusted association between dedicated appliance 14 and computing platform 20. Such associations are needed for applications such as "Web Dialer" and "VT Advantage": both of which are manufactured by Cisco Systems, Incorporated of San Jose, Calif. Other applications may relate to bridging, video-conferencing, meetings, scheduling, or any other information transfer that involves a dedicated appliance. Using the established association allows dedicated appliance 14 to share the resources of the associated computing platform 20. Communication system 10 enables a convergence between dedicated appliance 14 and computing platform 20 such that the benefits of computing platform 20 are realized by dedicated appliance 14.

In accordance with the teachings of the present invention, communication system 10 provides an architecture that exchanges and installs credentials in dedicated appliance 14. This achieves an effective connection between these two elements for end user 12. Once the connection is secured, end user 12 is then afforded the opportunity to attain the capabilities or to utilize the resources of computing platform 20. Thus, a provisioning process may be initiated such that dedicated appliance 14 begins monitoring a communications port for an initial request from computing platform 20 indicating an attempt to exchange identity credentials for the establishment of a secure, trusted communications channel between dedicated appliance 14 and computing platform 20. Associated with the initiation of the provisioning process, dedicated appliance 14 creates keying material (such as a random numeric or alphanumeric string) and derives an authentication key from the keying material. It also presents the keying material to the user for transfer to computing platform 20. Optionally, dedicated appliance 14 may present its communications address to the user so that the address may be made available to the computing platform 20. Dedicated appliance 14 then awaits (optionally for a specifically limited time) the arrival of a credential message from computing platform 20. Upon receipt of the credential message, dedicated appliance 14 validates the keyed authentication value using the derived authentication key. If the validation process fails, the provisioning process terminates. If the validation process succeeds, dedicated appliance 14 prepares the digital credential of computing platform 20 for later use. It may optionally derive the network address of computing platform 20 from the received credential message. It then creates a similar credential message containing its own digital credential (such as, for example, an X.509v3 Digital Certificate or any other suitable credential) and calculates a keyed authentication value using the derived authentication key. This value is inserted in the authentication message and the completed message is transmitted to computing platform 20. Dedicated appliance 14 may optionally await the receipt of a provisioning complete message from computing platform 20 (optionally for a limited time). The provisioning process is then considered complete. Additional details relating to such operations are provided below with reference to the flowcharts of FIG. 2 and FIG. 3.

Note that the calculation of the random string and the display/presentation of the dedicated appliance address may occur as a result of beginning the provisioning process rather than waiting until the receipt of the connection request. Also, please note that if the exchange is occurring via UDP rather than TCP, there is no indication of a connection request since UDP is a connectionless process.

End user 12 is a person or entity wishing to initiate a communication in communication system 10 via dedicated appliance 14 and to leverage capabilities of computing platform 20. End user 12 may initiate the operation of dedicated appliance 14 by depressing any selected key. Alternatively, end user 12 may initiate the operation of dedicated appliance 14 in any other suitable manner. In alternative embodiments, end user 12 may use any other suitable interface, such as a keyboard or other terminal equipment, in order to initiate the operations of dedicated appliance 14. In addition, end user 12 may initiate the operations of dedicated appliance 14 using a computer program, a database, or any other suitable component, device, element, or object capable of initiating a voice or a data exchange within communication system 10. Data, as used herein in this document, refers to any type of numeric, voice, video, audio-visual, or script data, or any other type of source or object code, or any other suitable information in any appropriate format that may be communicated to or from end user 12.

Dedicated appliance 14 is a device that may be used by end user 12 in order to facilitate the retrieval and delivery of information in communication system 10. Dedicated appliance 14 may be initiated by end user 12 by pressing any suitable button included thereon. For example, dedicated appliance 14 may include a specific key that represents a trigger for the establishment of the connection. Alternatively, the specific key may be replaced with a "help" symbol or a question mark ("?") such that non-English based communications may readily identify an element that may trigger the connection operation. In other scenarios, any suitable icon, text, symbol, or element may be used in order to represent a key for initiating the actions detailed herein.

Dedicated appliance 14 may be suitably coupled to any appropriate network, such as network 16, in order to facilitate communications in a network environment (e.g. transmission control protocol/internet protocol (TCP/IP) network communications in an IP telephony configuration). Dedicated appliance 14 may be provided with a speaker capable of delivering audible messages to end user 12. Dedicated appliance 14 may also include a suitable handset unit that allows the user to speak and hear information.

The term "dedicated appliance" encompasses a myriad of potential devices that may be used to facilitate the operations of communication system 10. For example, any of the group of dedicated appliances 28a-g (illustrated in FIG. 1) may be coupled to computing platform 20 via connection 40, which represents any suitable connection (e.g. a USB cable, a wireless connection, blue-tooth, optics, infrared, etc.). Note that neither blue-tooth nor USB necessarily use IP addresses. Communication system 10 may use the logical connections over a shared media network (such as over an IP network using Ethernet) or use a connection (wired or wireless) as outlined herein. Note also that the term "connection" as used in this document represents an association between two elements, which may be achieved in any number of fashions, as detailed herein.

Additionally, any of dedicated appliances 28a-g may cooperate with each other in order to facilitate a communication session initiated by end user 12. Dedicated appliance 28a is a personal digital assistant (PDA); dedicated appliance 28b is a cellular telephone; dedicated appliance 28c is a stereo; dedicated appliance 28d is an IP telephone; dedicated appliance 28e is a personal computer; dedicated appliance 28f is a laptop computer; dedicated appliance 28g is a digital camera. Dedicated appliances 28a-g may include a cradle apparatus that receives the device such that the connection process is initiated.

Each of dedicated appliances 28a-g may include a number of buttons or other means that, when properly activated, initiate a communication session for end user 12. This could simply be a mouse click that initiates some action for dedicated appliance 14 or for computing platform 20 to complete. The communication session or audible message may include any suitable descriptive information about establishing the secure connection, such as tutorials, guidance about corresponding operations, solutions, and answers to commonly asked questions. This allows end user 12 to navigate through the connection process for each of dedicated appliances 28a-g. Additionally, a selected key may be depressed in order to identify a status associated with a given interactive device 28a-g. In other scenarios, a remote control may be used to control the device in question. The remote control may include a series of buttons that affect the operation of dedicated appliances 28a-g. The remote control may use any suitable technology (e.g. infrared, blue-tooth, optics, etc.) in order to trigger or launch processes or tasks to be completed by dedicated appliances 28a-g. Remote control arrangements may be beneficial in conference settings.

Note that in a more particular embodiment of the present invention, once the provisioning process is initiated, if no designated certificate is available then a self-assigned certificate or any other suitable credential is created. Computing platform 20 contains a digital credential (such as an X.509v3 Digital Certificate or any other suitable credential). Computing Platform 20 determines/receives the network address of dedicated appliance 14 and receives the keying material generated by dedicated appliance. It then derives an authentication key and creates a credential message containing its digital credential and other information together with a keyed authentication value (such as an HMAC SHA-1. This message is then sent to dedicated appliance 14. Computing platform 20 then waits for a similar credential message from dedicated appliance 14 (optionally for a limited period of time). Upon receipt of a credential message from dedicated appliance 14, computing platform 20 validates the received keyed authentication value using the derived authentication key. If the validation process fails, the provisioning process terminates. If the validation process succeeds, computing platform 20 prepares the received digital credential for later use. It may optionally provide a response to dedicated appliance 14 indicating the successful completion of the exchange. The provisioning process is then considered complete.

Network 16 represents a series or points of nodes of interconnected communication paths for receiving and transmitting information that propagates through communication system 10. Network 16 may be coupled to dedicated appliance 14 at Internet 18 in order to provide any suitable data exchange there between. Network 16 may be operable to facilitate a communication session initiated by end user 12 through dedicated appliance 14. Network 16 may be any local area network (LAN), wireless local area network (WLAN), metropolitan area network (MAN), virtual private network (VPN), wide area network (WAN), or any other suitable architecture or system that facilitates communications. In one example, network 16 may implement an Internet protocol (IP) communications configuration, whereby a user datagram protocol (UDP)/Internet protocol (UDP/IP) language is provided. Other embodiments could include TCP, xxx/IP, or any other suitable transport, platform, or mechanism.

Internet 18 is a communication platform that is operable to store information sought by end user 12. Internet 18 may include a plurality of websites, web servers, and other elements that may be accessible via network 16. Internet 18 may provide an interface that allows information retrieval/delivery to be provided through or via dedicated appliance 14. In alternative embodiments, Internet 18 may be an Intranet or any other suitable communications element that is operable to facilitate a data exchange.

Computing platform 20 is a processor element (e.g. a laptop 32a or a personal computer 32b that may be connected to a given dedicated appliance). The processing elements of FIG. 1 represent only some of the potential devices that may be used in communication system 10. Any other suitable processing device may be used in conjunction with setting up a secure, trusted associated between the two linked components. Other examples could readily be implemented in the present architecture based on particular communication needs.

In an alternative embodiment of the present invention, dedicated appliance 14 and/or computing platform 20 are voice-activated. This feature may accommodate a wide array of end users, some of which may be visually impaired. Alternatively, such an operation may be applicable to persons with perfect vision but that seek a more convenient way of utilizing dedicated appliance 14. It is important to recognize that the enhanced operations of dedicated appliance 14 do not inhibit an existing communications architecture. Thus, the enhancements made to dedicated appliance 14 (or to computing platform 20) do not slow communication speeds associated with a conventional telephone application.

In a particular embodiment of the present invention, dedicated appliance 14 and computing platform 20 include software that is operable to facilitate appropriate signaling for establishing a secure connection. The augmentation or enhancement may be provided in just one of these elements or in both elements. Such design choices may be based on particular arrangement or configuration needs. Alternatively, this signaling capability may be provided by any suitable hardware, component, device, application specific integrated circuit (ASIC), field-programmable gate array (FPGA), microprocessor, read only memory (ROM) element, random access memory (RAM) element, erasable programmable ROM (EPROM), electrically erasable programmable ROM (EEPROM), processor, algorithm, element or object that is operable to perform such operations. Note that such a signaling functionality may also be provided external to these elements in alternative embodiments and where appropriate.

Figure 2:
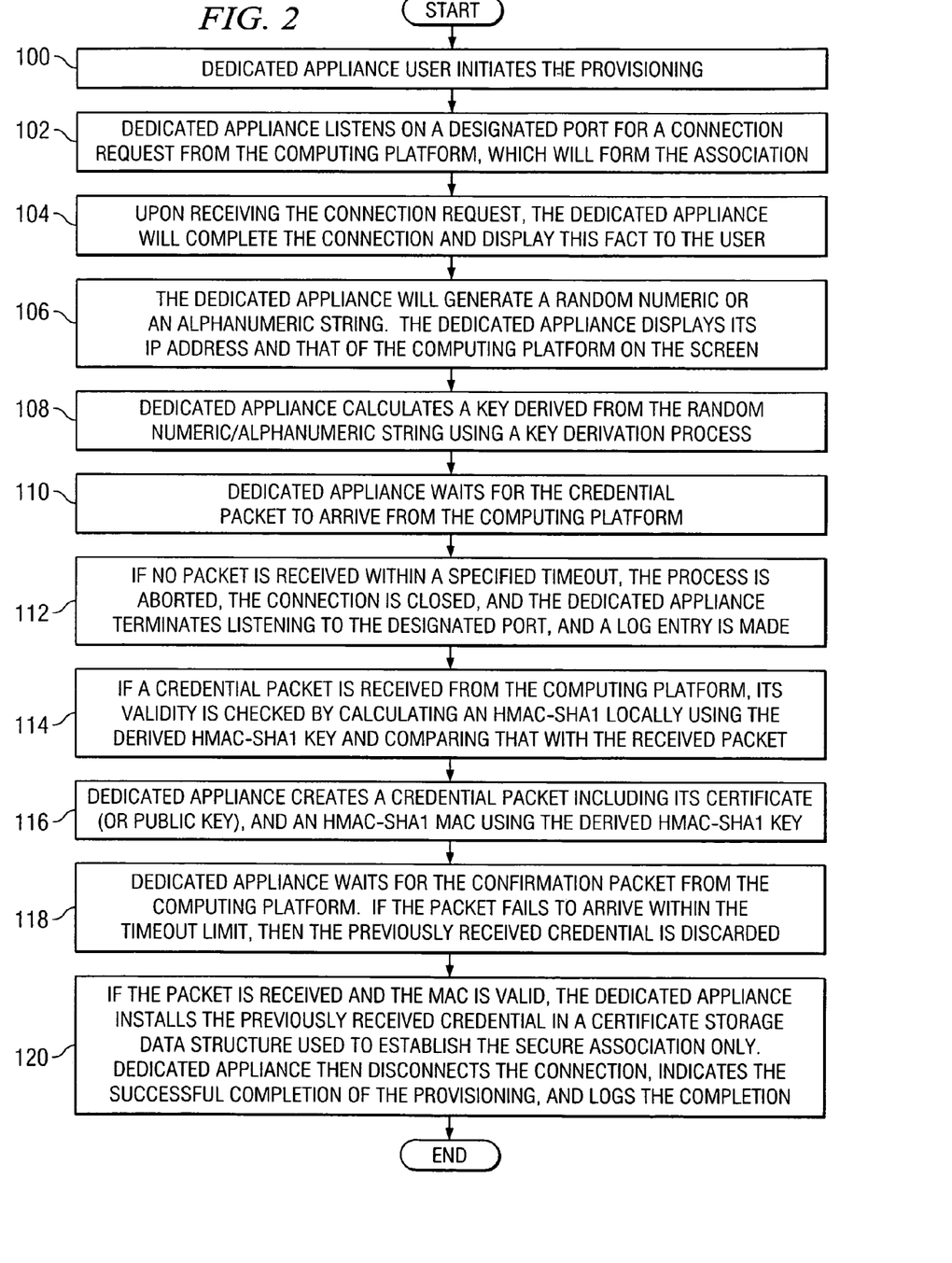
FIG. 2 is a flowchart illustrating a series of example steps associated with a method for establishing a connection from the perspective of a dedicated appliance in accordance with one embodiment of the present invention.

FIG. 2 is a flowchart illustrating a series of example steps associated with a method for establishing an association between two components from the perspective of dedicated appliance 14 in accordance with one embodiment of the present invention. It may be assumed for purposes of this example that both dedicated appliance 14 and computing platform 20 exist on an IP network with routable connections between the two devices. It may further be assumed that dedicated appliance 14 and computing platform 20 have digital certificates (or at least public/private key pairs or other suitable credentials) that are suitable for authenticating a connection once these credentials are shared and installed on the appropriate sides of the association. Dedicated appliance 14 and computing platform 20 act in cooperation to install these credentials.

The method of FIG. 2 may begin at step 100, where the user initiates the provisioning process by selecting a function at the targeted device (e.g. from a menu of some form associated with dedicated appliance 14). At step 102, dedicated appliance 14 calculates the random string, presents the address to the user, and begins listening on a designated TCP port for a TCP connection request from computing platform 20, which will form the association. At step 104, upon receiving the connection request, dedicated appliance 14 may complete the connection and (potentially) display this result to the user. At step 106, dedicated appliance 14 may generate a random numeric or an alphanumeric string (or it may have been done previously), which may be displayed on the device's screen (if present). Dedicated appliance 14 may also display its IP address and that of computing platform 20 on the screen where appropriate.

At step 108, dedicated appliance 14 calculates a key (e.g. a hashed message authentication code-secure hash Algorithm 1 (HMAC-SHA1) key, (or other suitable HMAC method) or any other suitable message integrity check method) derived from the random numeric/alphanumeric string using a key derivation process (any number of key derivation functions may be used). At step 110, dedicated appliance 14 waits for the credential packet to arrive from computing platform 20. At step 112, if no packet is received within a specified timeout, the process may be aborted, the TCP connection may be closed, dedicated appliance 14 terminates monitoring of the designated port, and a log entry may be made. All, some, or none of these tasks may be executed. At step 114, where a credential packet is received from computing platform 20, its validity is checked by calculating a local element (e.g. a HMAC-SHA1 locally) using the derived key and comparing that with the received packet. If these match, the credential may be accepted and prepared for installation. Otherwise, the actions identified in step 112 may be performed and the process may be aborted.

At step 116, dedicated appliance 14 creates a credential packet including its certificate (or public key), and a media access control (MAC) element (e.g. an HMAC-SHA1 MAC) using the derived key. This MAC element is appended to the credential packet and sent to computing platform 20. Dedicated appliance 14 then waits for the confirmation packet from computing platform 20. If the packet fails to arrive within the timeout limit, then the previously received credential is discarded and the other actions specified in step 112 are performed. If the packet is received and the MAC element is valid, dedicated appliance 14 installs the previously received credential in a certificate storage data structure used to establish the secure association only. Dedicated appliance 14 can then disconnect the TCP connection, indicate the successful completion of the provisioning, and log the completion. Dedicated appliance 14 can terminate monitoring of the provisioning TCP port.

Figure 3:
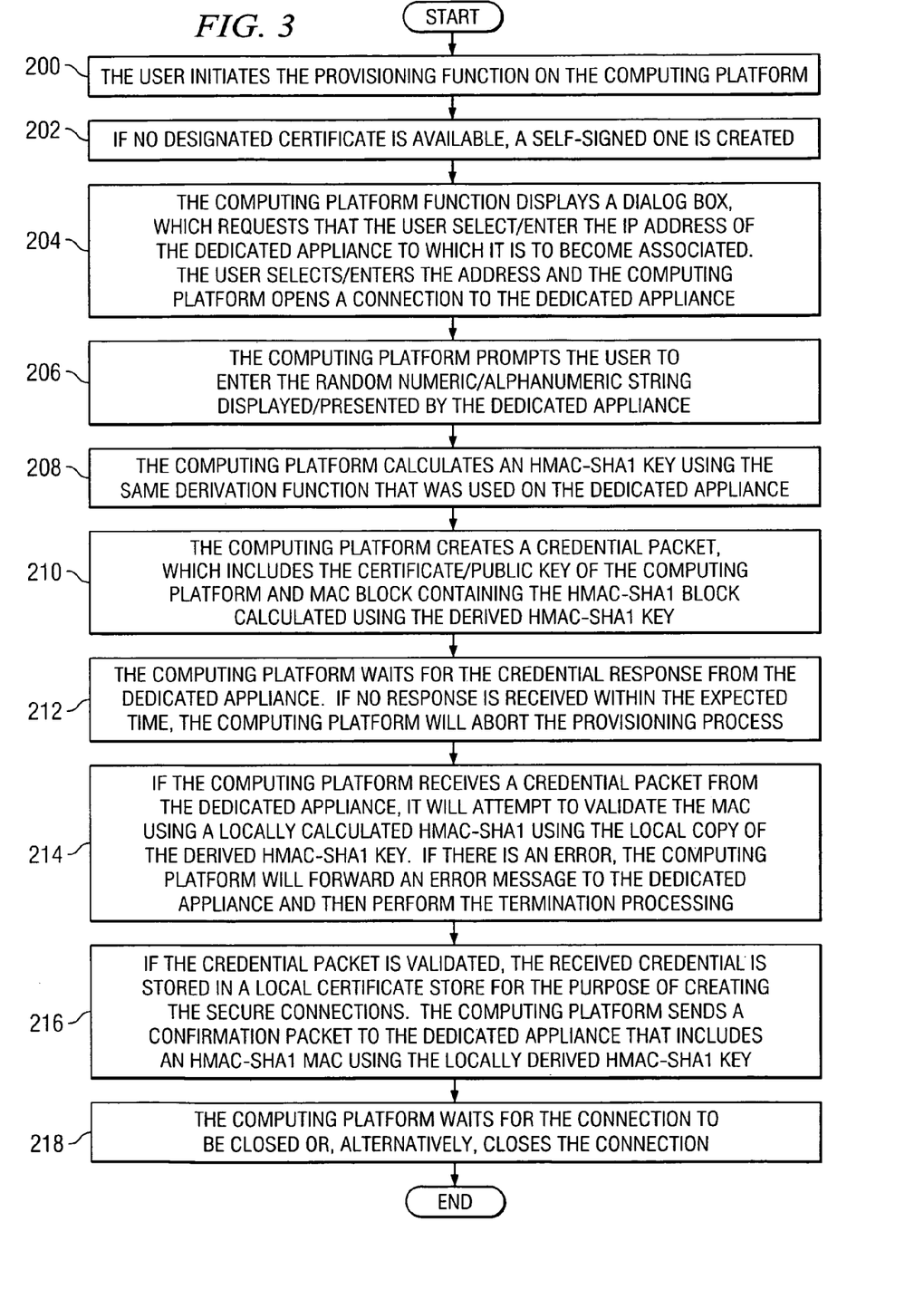
FIG. 3 is a flowchart illustrating a series of example steps associated with a method for establishing a connection from the perspective of a computing platform in accordance with one embodiment of the present invention.

FIG. 3 is a flowchart illustrating a series of example steps associated with a method for establishing an association between two components from the perspective of computing platform 20 in accordance with one embodiment of the present invention. The method may begin at step 200 where the user initiates the provisioning function on computing platform 20. At step 202, if no designated certificate is available, a self-assigned one is created. At step 204, computing platform 20 function displays a dialog box, which requests that the user select/enter the IP address of dedicated appliance 14 to which it is to become associated. The user selects/enters the address and computing platform 20 opens a connection to dedicated appliance 14. At step 206, computing platform 20 prompts the user to enter the random numeric/alphanumeric string displayed/presented by dedicated appliance 14. At step 208, computing platform 20 may calculate a key (e.g. an HMAC-SHA1 key) using the same derivation function that was used on dedicated appliance 14.

At step 210, computing platform 20 creates a credential packet that includes the certificate/public key of computing platform 20 and a MAC element containing the HMAC-SHA1 element calculated using the derived HMAC-SHA1 key (in the example implementation). Computing platform 20 then transmits the credential packet. At step 212, computing platform 20 waits for the credential response from dedicated appliance 14. If no response is received within the expected time, computing platform 20 will abort the provisioning process, terminate the TCP connection, inform the user of the failure, and log a security error. At step 214, if computing platform 20 receives a credential packet from dedicated appliance 14, it will attempt to validate the MAC element using a locally calculated HMAC-SHA1 (i.e. using the local copy of the derived HMAC-SHA1 key). If there is an error, computing platform 20 will forward an error message to dedicated appliance 14 and then perform the termination processing specified in step 212 above.

At step 216, if the credential packet is validated, the received credential is stored in a local certificate storage for creating the secure connection. Computing platform 20 sends a confirmation packet to dedicated appliance 14 including an HMAC-SHA1 MAC using the locally derived HMAC-SHA1 key, and then informs the user. At step 218, computing platform 20 waits for the TCP connection to be closed or alternatively closes the TCP connection.

Both sides now have the credentials necessary to establish a transport layer security (TLS) connection between them and the credentials can be earmarked in such a way as to only be used for the purposes of this association. Multiple associations may be provisioned on dedicated appliance 14 and computing platform 20 if needed. An aging algorithm can be used to manage these and to overwrite them if needed. To use the association, a simple TLS connection would be established, using standard secure socket layer (SSL)/TLS establishment procedures. Dedicated appliance 14 would be able to authenticate the connection based on the certificate present in the certification storage. The fact that it is present in the special association certification storage would allow for the authorization of the connection. The same would be true for computing platform 20.

It is imperative to note that some of the steps illustrated in FIGS. 2 and 3 may be changed or deleted where appropriate and additional steps may also be added to the flow chart. These changes may be based on specific communication architectures or particular interfacing arrangements and configurations of associated elements and do not depart from the broad scope or the expansive teachings of the present invention. The flowcharts of FIGS. 2 and 3 provide only one set of example flows associated with establishing a secure, trusted connection between two elements.

Although the present invention has been described in detail with reference to particular communications, communication system 10 may be used in any protocol (e.g. wireless or automated protocols that do not require an initiation by the end user) seeking to secure a connection for a given dedicated appliance. Any suitable communications that involve such a process may benefit from the teachings of the present invention.

In addition, communication system 10 may be extended to any scenario in which end user 12 can depress a given button in order to trigger the initiation of the establishment of the connection. Thus, any consumer electronic device may be used and considered as a dedicated appliance capable of providing such potential capabilities to end user 12. Such dedicated appliances are inclusive of a telephone and the elements illustrated in FIG. 2, as well as any other suitable device, component, object, element, which is capable of delivering information to be heard by end user 12.

In addition, although the present invention has referenced use of an HMAC-SHA1 key, any other suitable protocol may be used in order to achieve this result. The HMAC-SHA1 reference has only been offered as one example, whereas numerous other protocols may readily be employed in communication system 10 to achieve the teachings of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a dedicated appliance comprising a telephone having a plurality of buttons, the dedicated appliance operable to:
in response to receiving a provisioning request from a user of the dedicated appliance, monitor a designated port of the dedicated appliance for an initial connection request from a particular computing platform;
generate a random numeric string or an alphanumeric string;
receive a connection request;
if the connection request is from the particular computing platform, complete a connection between the dedicated appliance and the computing platform;
display the random numeric string or the alphanumeric string at the dedicated appliance to enable a user to enter the random numeric string or the alphanumeric string at the computing platform;
calculate a key derived from the random numeric string or the alphanumeric string using a key derivation process;
wait for a first credential packet from the computing platform before securing the connection between the dedicated appliance and the computing platform, the first credential packet comprising an element calculated using the random numeric string or the alphanumeric string transferred by the user, the first credential packet further comprising a public key of the computing platform;
if the first credential packet is received from the computing platform, check the validity of the first credential packet by using the calculated key and the first credential packet;
create a second credential packet comprising a second element;
transmit the second credential packet to the computing platform;
wait for a confirmation packet from the computing platform;
if the confirmation packet fails to arrive within a specified time period, discard the first credential packet; and
if the first credential packet and the second element are valid and the confirmation packet arrives within the specified time period, install the first credential packet in a certificate storage data structure for use in securing the connection between the dedicated appliance and the computing platform.

2. The apparatus of claim 1, if no packet is received within a specified timeout, the dedicated appliance operable to abort the provisioning process of securing the connection between the dedicated appliance and the computing platform.

3. The apparatus of claim 1, after a specified timeout, the dedicated appliance operable to perform at least one of the following:
close a corresponding transmission control protocol (TCP) connection; or
make a log entry.

4. The apparatus of claim 1, the dedicated appliance operable to check the validity of the first credential packet by:
calculating a local element using the calculated key;
comparing the local element with the first credential packet; and
if these match, accepting a credential and preparing the credential for installation.

5. The apparatus of claim 1, wherein the second credential packet includes a certificate and a media access control (MAC) element determined using the calculated key, and wherein the MAC element is appended to the second credential packet.

6. The apparatus of claim 1, wherein the dedicated appliance is operable to perform a selected one of disconnecting the secure connection, indicating a successful completion of the provisioning, and logging the completion.

7. The apparatus of claim 1, wherein the dedicated appliance includes a visual display operable to display text information to an end user.

8. An apparatus, comprising:
a computing platform operable to:
display a request for a user to enter an address of a dedicated appliance comprising a telephone, the dedicated appliance provisioned by a user of the dedicated appliance to monitor a designated port of the dedicated appliance for an initial connection request from the computing platform;
establish a connection with the dedicated appliance in response to receiving the address, either the computing platform or the dedicated appliance initiating a provisioning process on the computing platform;
if no designated certificate is available, create a self-assigned certificate;
prompt entry by the user of a random numeric string or an alphanumeric string displayed by the dedicated appliance;
calculate a derived key using the random numeric string or the alphanumeric string entered by the user;

create a first credential packet that includes a certificate of the computing platform and a message authentication code (MAC) element, the MAC element comprising an element calculated using the derived key; and transmit the first credential packet to the dedicated appliance in order to secure the connection with the dedicated appliance, wherein if the first credential packet is received from the computing platform, the validity of the first credential packet is checked by the dedicated appliance by comparing a key derived by the dedicated appliance to the first credential packet;

receive a second credential packet created by the dedicated appliance, the second credential packet comprising a second element;

if the second element is valid, send a confirmation packet to the dedicated appliance;

wherein if the confirmation packet fails to arrive within a specified time period, the first credential packet is discarded by the dedicated appliance; and wherein if the first credential packet and the second element are valid and the confirmation packet arrives within the specified time period, the first credential packet is installed by the dedicated appliance in a certificate storage data structure for use in securing the connection between the dedicated appliance and the computing platform.

9. The apparatus of claim 8, wherein the computing platform:
waits for a credential response from the dedicated appliance; and
if the credential response is not received within an expected time, aborts the provisioning process.

10. The apparatus of claim 8, wherein the computing platform:
waits for a credential response from the dedicated appliance; and
if the credential response is not received within the expected time, terminates the connection or informs an end user of the failure or logs a security error.

11. The apparatus of claim 8, wherein if there is an error, the computing platform forwards an error message to the dedicated appliance and then performs a termination process.

12. The apparatus of claim 8, wherein if the first credential packet is validated, a received credential is stored in a local certificate storage for the purpose of creating the secure connection.

13. The apparatus of claim 8, wherein the computing platform is a selected one of a personal computer and a laptop computer.

14. A non-transitory computer readable medium that embodies software comprising computer code such that when executed is operable to:
in response to receiving a provisioning request from a user of the dedicated appliance, monitor a designated port of a dedicated appliance for an initial connection request from a particular computing platform;
generate a random numeric string or an alphanumeric string;
receive a connection request;
if the connection request is from the particular computing platform, complete a connection between the dedicated appliance and the computing platform;
display the random numeric string or the alphanumeric string at the dedicated appliance to enable a user to enter the random numeric string or the alphanumeric string at the computing platform;
calculate a key derived from the random numeric string or the alphanumeric string using a key derivation process;
wait for a first credential packet from the computing platform before securing the connection between the dedicated appliance and the computing platform, the first credential packet comprising an element calculated using the random numeric string or the alphanumeric string transferred by the user, the first credential packet further comprising a public key of the computing platform;
if the first credential packet is received from the computing platform, check the validity of the first credential packet by using the calculated key and the first credential packet;
create a second credential packet comprising a second element;
transmit the second credential packet to the computing platform;
wait for a confirmation packet from the computing platform;
if the confirmation packet fails to arrive within a specified time period, discard the first credential packet; and
if the first credential packet and the second element are valid and the confirmation packet arrives within the specified time period, install the first credential packet in a certificate storage data structure for use in securing the connection between the dedicated appliance and the computing platform.

15. The medium of claim 14, if no packet is received within a specified timeout, the code operable to abort the provisioning process of securing the connection between the dedicated appliance and the computing platform.

16. The medium of claim 14, after a specified timeout the code operable to perform at least one of the following:
close a corresponding transmission control protocol (TCP) connection; or
make a log entry.

17. The medium of claim 14, the code operable to check the validity of the first credential packet by:
calculating a local element using the calculated key;
comparing the local element with the first credential packet; and
if these match, accepting a credential and preparing the credential for installation.

18. The medium of claim 14, wherein the
second credential packet includes a certificate and a media access control (MAC) element determined using the calculated key, wherein the MAC element is appended to the second credential packet.

19. The medium of claim 14, wherein the code is further operable to:
perform a selected one of disconnecting the secure connection, indicating a successful completion of the provisioning, and logging the completion.

20. A method, comprising:
in response to receiving a provisioning request from a user of the dedicated appliance, monitoring a designated port of the dedicated appliance for an initial connection request from a particular computing platform;
generating a random numeric string or an alphanumeric string;
receiving a connection request;
if the connection request is from the particular computing platform, completing a connection between the dedicated appliance and the computing platform;

displaying the random numeric string or the alphanumeric string at the dedicated appliance to enable a user to enter the random numeric string or the alphanumeric string at the computing platform;

calculating a key derived from the random numeric string or the alphanumeric string using a key derivation process;

waiting for a first credential packet from the computing platform before securing the connection between the dedicated appliance and the computing platform, the first credential packet comprising an element calculated using the random numeric string or the alphanumeric string transferred by the user, the first credential packet further comprising a public key of the computing platform;

if the first credential packet is received from the computing platform, checking the validity of the first credential packet by using the calculated key and the first credential packet;

create a second credential packet comprising a second element;

transmit the second credential packet to the computing platform;

wait for a confirmation packet from the computing platform;

if the confirmation packet fails to arrive within a specified time period, discard the first credential packet; and if the first credential packet and the second element are valid and the confirmation packet arrives within the specified time period, install the first credential packet in a certificate storage data structure for use in securing the connection between the dedicated appliance and the computing platform.

21. The method of claim 20, further comprising, if no packet is received within a specified timeout, aborting the provisioning process of securing the connection between the dedicated appliance and the computing platform.

22. The method of claim 20, further comprising, after a specified timeout, at least one of the following is performed:
closing a corresponding transmission control protocol (TCP) connection; or
making a log entry.

23. The method of claim 20, further comprising checking the validity of the first credential packet by:
calculating a local element using the calculated key;
comparing the local element with the first credential packet; and
if these match, accepting a credential and preparing the credential for installation.

24. The method of claim 20, wherein the second credential packet includes a certificate and a media access control (MAC) element determined using the calculated key, wherein the MAC element is appended to the second credential packet.

25. The method of claim 20, further comprising:
performing a selected one of disconnecting the secure connection, indicating a successful completion of the provisioning, and logging the completion.

26. An apparatus, comprising:
a telephone operable to:
in response to receiving a provisioning request from a user of the telephone, monitor a designated port of the telephone for an initial connection request from a particular computing platform;
receive a connection request;

if the connection request is from the particular computing platform, complete a connection between the dedicated appliance and the computing platform;
generate a random string comprising a numeric string or an alphanumeric string;
calculate a key derived from the random string using a key derivation process;
display the random string at the telephone to enable a user to enter the random string at a computing platform;
wait for a first credential packet from the computing platform, the first credential packet comprising a digital certificate of the computing platform and a message authentication code calculated using the random string transferred by the user;
if the first credential packet is received from the computing platform, use the key to check the validity of the first credential packet;
create a second credential packet comprising a second element;
transmit the second credential packet to the computing platform;
wait for a confirmation packet from the computing platform;
if the confirmation packet fails to arrive within a specified time period, discard the first credential packet; and
if the first credential packet and the second element are valid and the confirmation packet arrives within the specified time period, install the first credential packet in a certificate storage data structure for use in securing the connection between the telephone and the computing platform.

27. The apparatus of claim 1,
wherein the second credential packet comprises a digital certificate of the telephone.

28. The apparatus of claim 1, the telephone further operable to:
store the first credential packet for use in a second connection between the telephone and the computing platform, the second connection comprising a Secure Socket Layer or Transport Layer Security connection.

29. The apparatus of claim 1, the telephone further operable to:
mark the first credential packet for use only in a Secure Socket Layer or Transport Layer Security connection between the telephone and the telephone.

30. An apparatus, comprising:
a dedicated appliance comprising a telephone having a plurality of buttons, the dedicated appliance operable to:
in response to receiving a provisioning request, monitor a designated port of the dedicated appliance for a connection request from a particular computing platform;
generate a random numeric string or an alphanumeric string;
receive a connection request;
if the connection request is from the particular computing platform, complete a connection between the dedicated appliance and the computing platform;
display the random numeric string or the alphanumeric string at the dedicated appliance to enable a user to enter the random numeric string or the alphanumeric string at the computing platform;
calculate a key derived from the random numeric string or the alphanumeric string using a key derivation process;

wait for a first credential packet from the computing platform before securing the connection between the dedicated appliance and the computing platform, the first credential packet comprising a first element calculated using the random numeric string or the alphanumeric string transferred by the user, the first credential packet further comprising a public key of the computing platform;

if the first credential packet is received from the computing platform, check the validity of the first credential packet by using the calculated key and the first credential packet;

create a second credential packet comprising a second element calculated using the random numeric string or the alphanumeric string;

transmit the second credential packet to the computing platform;

wait for a confirmation packet from the computing platform;

if the confirmation packet fails to arrive within a specified time period, discard the first credential packet; and if the first credential packet and the second element are valid and the confirmation packet arrives within the specified time period, install the first credential packet in a certificate storage data structure for use in securing the connection between the dedicated appliance and the computing platform.

* * * * *